United States Patent
Chadbourne

(10) Patent No.: US 8,340,809 B2
(45) Date of Patent: Dec. 25, 2012

(54) INTELLIGENT SHELVING SYSTEM AND DIVIDING ELEMENT

(75) Inventor: Andrew Chadbourne, Stockport (GB)

(73) Assignee: Intellident Limited, Birmingham (GB)

(*) Notice: Subject to any disclaimer, the term of this patent is extended or adjusted under 35 U.S.C. 154(b) by 831 days.

(21) Appl. No.: 12/184,106

(22) Filed: Jul. 31, 2008

(65) Prior Publication Data

US 2009/0076646 A1 Mar. 19, 2009

(30) Foreign Application Priority Data

Aug. 2, 2007 (GB) .................................. 0715058.4

(51) Int. Cl.
*G08B 13/14* (2006.01)
*G06F 15/173* (2006.01)
*H04B 1/00* (2006.01)
*H04L 29/06* (2006.01)
*G05B 19/00* (2006.01)
*H04Q 5/22* (2006.01)

(52) U.S. Cl. .................... 700/214; 340/572.7; 340/10.1; 340/572.1; 340/5.92; 713/153; 709/220

(58) Field of Classification Search .................. 700/214; 340/372.1
See application file for complete search history.

(56) References Cited

U.S. PATENT DOCUMENTS

| | | | |
|---|---|---|---|
| 2005/0040934 A1* | 2/2005 | Shanton | 340/5.92 |
| 2006/0220876 A1* | 10/2006 | Campero et al. | 340/572.7 |
| 2007/0046552 A1* | 3/2007 | Marino | 343/720 |
| 2009/0076646 A1* | 3/2009 | Chadbourne | 700/214 |
| 2010/0079240 A1* | 4/2010 | Higham | 340/5.54 |
| 2010/0102969 A1* | 4/2010 | Svalesen et al. | 340/572.8 |
| 2010/0134257 A1* | 6/2010 | Puleston et al. | 340/10.4 |

FOREIGN PATENT DOCUMENTS

| | | |
|---|---|---|
| EP | 1785913 A2 | 5/2007 |
| GB | 2419722 A | 3/2006 |
| WO | 2005104015 A1 | 11/2005 |
| WO | 2007099723 A1 | 9/2007 |

\* cited by examiner

*Primary Examiner* — Gene Crawford
*Assistant Examiner* — Yolanda Jones
(74) *Attorney, Agent, or Firm* — J. Charles Dougherty

(57) ABSTRACT

An intelligent shelving system and associated dividing element. One or more dividing elements are arranged to communicate with a controller, each of the one or more dividing elements including an antenna having a detection plane and a base for placement on a shelf. The detection plane of the antenna is configured so as to be substantially parallel to the base. Each of the one or more dividing elements is arranged to identify electronically tagged items falling within the detection plane of its respective antenna and communicate data on said identified items to the controller.

14 Claims, 3 Drawing Sheets

INTELLIGENT SHELVING SYSTEM AND DIVIDING ELEMENT

CROSS-REFERENCE TO RELATED APPLICATIONS

This application claims the benefit of United Kingdom patent application GB 0715058.4, entitled "Intelligent Shelving System and Dividing Element" and filed on Aug. 2, 2007. Such patent application is fully incorporated by reference herein.

FIELD OF THE INVENTION

The present invention relates to a shelving system and an associated dividing element that is able to provide information on electronically tagged items placed on the shelf.

BACKGROUND TO THE INVENTION

Systems known as "smart shelving" and "intelligent shelving" have now been in existence for some time. These systems typically include an RFID antenna within the body of the shelf or positioned above the shelf that is used to communicate with radio frequency identifier (RFID) tags placed on or in items on the shelf. Such shelving systems are used by retailers to identify when stock levels are running low and also by facilities such as libraries to identify whether articles have been placed on the incorrect shelves.

Such systems are extremely difficult to retrofit. Where a retrofit is not possible, existing shelving must first be removed which significantly increases costs. Indeed, given the integration of the antenna within the shelf unit itself, a great deal of cost is associated with introduction of such smart or intelligent shelving systems.

An additional problem experienced with the systems is that typically the shelving systems cannot identify where on a particular shelf an item may be located. They normally can only identify whether or not an item is present on that shelf but nothing more.

STATEMENT OF THE INVENTION

According to an aspect of the present invention there is provided an intelligent shelving system comprising one or more dividing elements arranged to communicate with a controller, each of the one or more dividing elements including an antenna having a detection plane and a base for placement on a shelf, the detection plane of the antenna being substantially perpendicular to the base, wherein each of the one or more dividing elements is arranged to identify electronically tagged items falling within the detection plane of its respective antenna and communicate data on said identified items to the controller.

The intelligent shelving system may include a communications link for connecting each of the one or more dividing elements to the controller. Preferably, the communications link comprises a track arranged to run the length of a shelf, each of the one or more dividing elements including an interface for connection to the track. Most preferably, the interface is positioned such that the orientation of the dividing element when connected to the track causes the detection plane of the antenna to be substantially aligned with the items to be detected. Preferably the track includes a power supply means for providing power to the one or more dividing elements. The track may be a bus.

The one or more dividing elements may include an audio and/or visual indicator that is controllable by the dividing element and/or the controller. For example, where a number of dividing elements are positioned along the length of a shelf, the controller may trigger one or more of the dividing elements to activate the audio and/or visual indicator to flag itself to a user. This may be used to indicate where an item should be placed, where an item is out of place or where an item exists that is being searched for.

Optionally, the antenna may operate in dual opposing directions.

The visual indicator may include an LCD display.

In a preferred embodiment of the present invention, the one or more dividing elements may each include an antenna control system for communication with other dividing elements and/or detection of overlapping transmission fields from other antennas, the antenna control system being configured to coordinate with the other dividing elements to optimise transmission signal strength. The antenna control system may include a subsidiary antenna for monitoring of other overlapping signals.

Preferably, the dividing elements include an RFID transceiver for communication with RFID tags via the antenna.

According to another aspect of the present invention, there is provided an intelligent shelving system comprising one or more dividing elements coupleable to a controller via a track wherein each of the one or more dividing elements includes:
an antenna having a detection plane;
a transceiver coupled to the antenna;
a base for placement on a shelf; and,
an interface for connection to the track and being coupled to the transceiver;
the transceiver being arranged to receive signals of detected electronically tagged items falling within the detection plane the antenna and communicate data on said signals to the controller via the interface.

The system may further comprise a power supply connectable to the track, wherein the interface of each of the one or more dividing elements includes a power connector for obtaining power for the dividing element from the power supply via the track.

According to another aspect of the present invention, there is provided a dividing element for an intelligent shelving system, the dividing element including:
an antenna having a detection plane;
a transceiver coupled to the antenna;
a base for placement on a shelf; and,
an interface for communication with a remote controller;
wherein the transceiver is arranged to receive signals of detected electronically tagged items falling within the detection plane the antenna and communicate data on said signals to the controller via the interface.

The interface may include a wired connector for connection to a bus.

The interface may include a radio frequency transceiver for communication with the remote controller.

BRIEF DESCRIPTION OF THE DRAWINGS

Embodiments of the present invention will now be described in detail with reference to the accompanying drawings in which.

DETAILED DESCRIPTION

Figure 1:
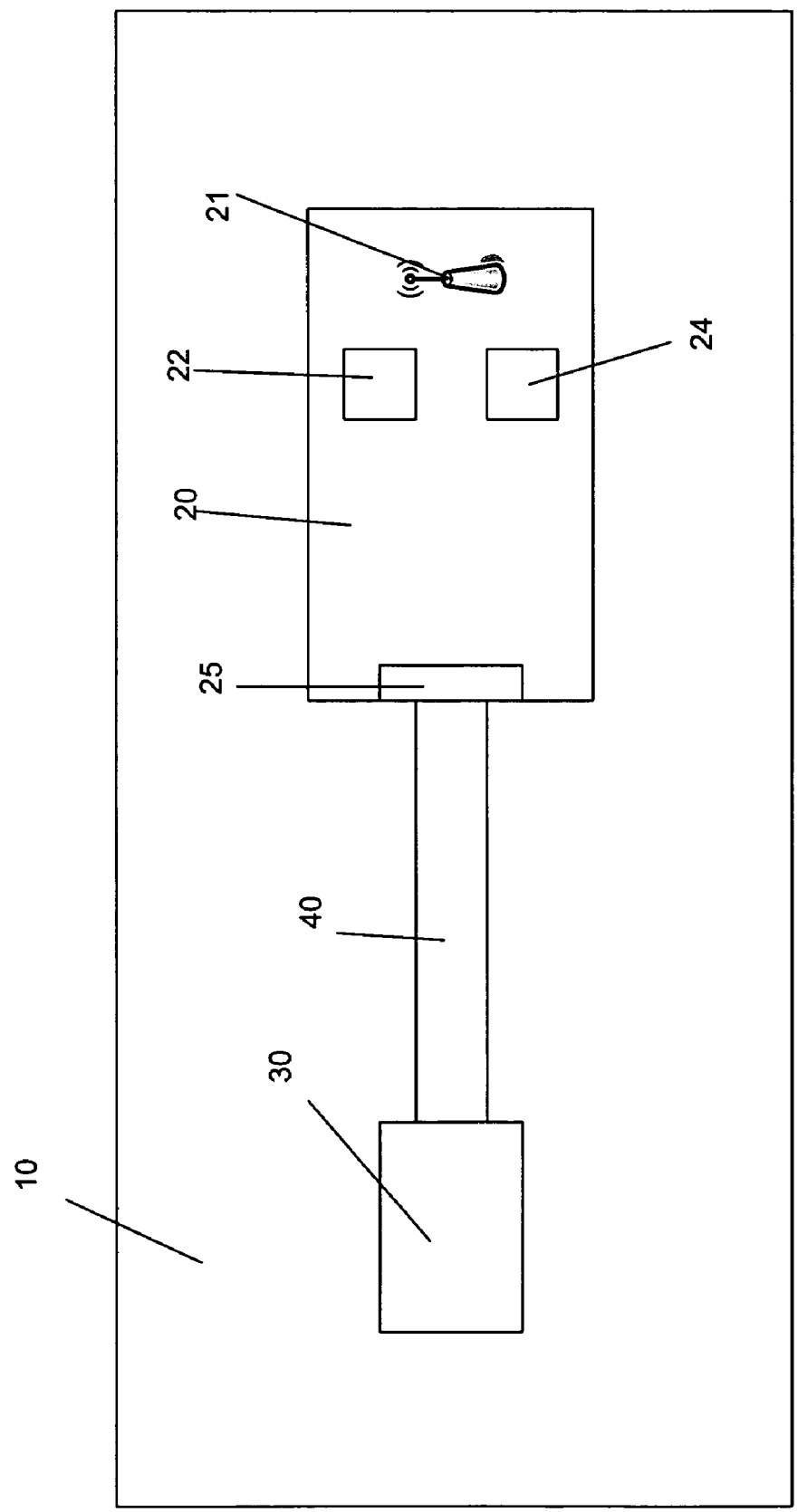
FIG. 1 is a schematic diagram of an intelligent shelving system according to an embodiment of the present invention.

FIG. 1 is a schematic diagram of an intelligent shelving system according to an embodiment of the present invention.

The intelligent shelving system 10 includes a dividing element 20 and a controller 30. The controller 30 is connected to the dividing element 20 via a communications link 40.

The dividing element includes an antenna 21, antenna control system 22, an RFID transceiver 24 and an interface 25. The dividing element connects to the communication link 40 via the interface 25. In a preferred embodiment of the present invention, the communications link 40 provides both data communications functionality between the controller 30 and the dividing element 20 and also power to the dividing element 20.

Figure 2:
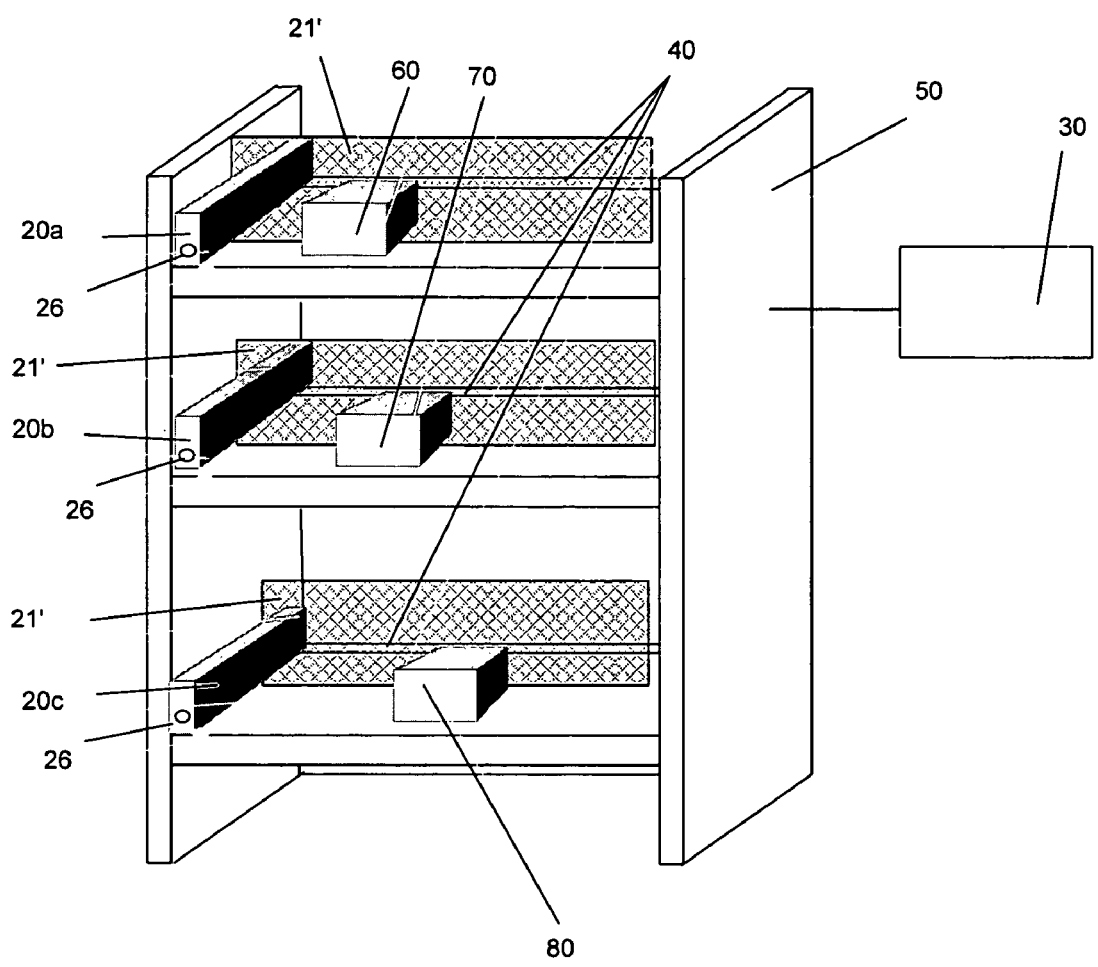
FIG. 2 is a perspective view of an intelligent shelving system according to an embodiment of the present invention in use; and, FIG. 3 is another perspective view of an intelligent shelving system according to an embodiment of the present invention when in use.

FIG. 2 is a perspective view of the intelligent shelving system 10 of FIG. 1 in use.

The intelligent shelving system 10 is installed for use in conjunction with an existing shelving system 50. The controller 30 connects via communication link 40 to a number of dividing elements 20a-c. Tagged items 60-80 are placed at various locations on the shelving system 50.

If a user wishes to perform a stock inventory of items on the shelving system 50, an appropriate function is triggered on the controller. The controller communicates via communication link 40 to the dividing elements 20a-c which each in turn use their respective RFID transceiver 24 and antenna 21 to read the RFID tags of the items within range. In the illustrated embodiment the antenna 21 are uni-directional having a detection field 21' as illustrated. However, it will be appreciated that bidirectional antennas could also be used or multiple opposing facing antennas to enable dividing elements 20 to interrogate tags in both directions. Data read from the tags is transmitted via communication link 40 back to the controller 30 to enable the inventory to be compiled.

The dividing elements 20a-c may include one or more indicators 26 that could be sounded or illuminated or otherwise used to alert the user's attention. In such a scenario, the indicator 26 of two adjacent dividing elements 20 could be illuminated if an item is incorrectly placed between the two dividing elements 20 or if an item is to be placed between them. Different indicators or indicator patterns may be used to indicate incorrectly located items and correct locations.

Alternatively, the user may know that the indicator of dividing element 20 refers to items to its left or right depending on configuration of the system. Where bidirectional antennas are used or multiple antennas, multiple indicators may also be used to indicate the direction in which the item should be placed to the side of the divider. Optionally, the indicator may include an LCD display to provide further information to the user. For example, the controller may be able to interrogate the RFID tags via the respective dividing elements to provide an exact location of a particular item and provide an appropriate prompt in the closest LCD display such as "fifth item to the right".

In the illustrated preferred embodiment, the communication link 40 runs along the length at the back of the shelf. This configuration is preferred because this enables the interface 25 of each dividing element 20 to be appropriately placed at the rear of the dividing element. By connecting the interface 25 to the communication link, it can be ensured that the dividing element 20 has its antenna 21 oriented in the correct direction such that its detection field is aligned with elements positioned on the shelf.

Each dividing element 20 may include some form of securing mechanism to secure it to the shelf to prevent it being knocked over or moved. Additionally, in this manner the dividing element 20 may be used as a traditional shelf divider for dividing areas of shelves, supporting items that may not be able to support themselves etc.

The dividing elements may be appropriately covered for branding and improvement of aesthetic appearance and the like.

Figure 3:
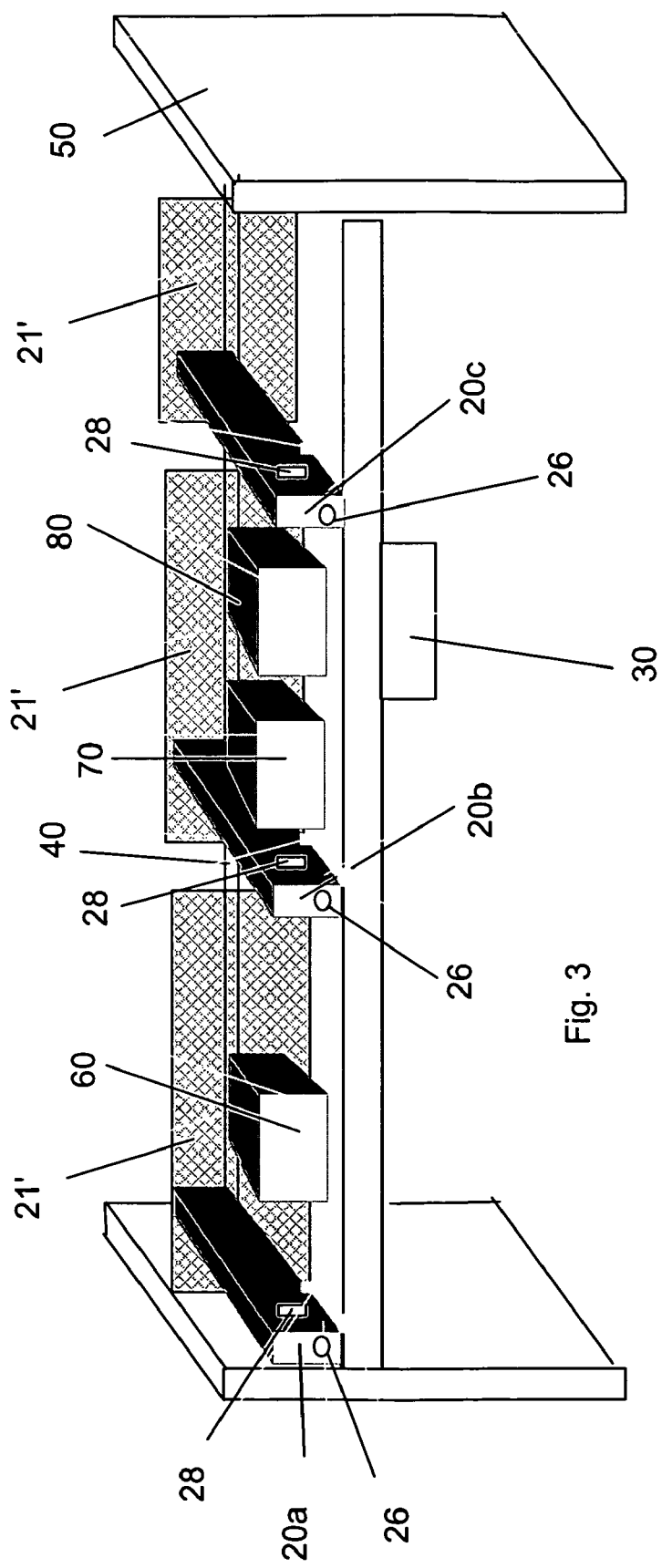

FIG. 3 is a perspective view of an intelligent shelving system according to another aspect of the present invention.

In the illustrated embodiment, multiple dividing elements 20a-c communicate with each other to negotiate appropriate antenna power settings and other settings such that an appropriate detection field can be maintained by each dividing element such that it does not overlap with that of other dividing elements 20. This is preferably achieved by a processor 28 located within each dividing element 20 that operates negotiations on a peer-to-peer basis.

Other configurations and indeed additions can be envisaged. Various algorithms could be implemented by the controller and/or dividing elements to determine location of items on shelves, ordering and the like.

Although tags have been discussed purely based on RFID technology, other tagging technologies could also be used and fall within the scope of the presently claimed invention.

The communication link 40 could be a bus of some form. It may be in the form of a track. Preferably, the communication link 40 is arranged such that a dividing element 20 can be connected at any point along its length and such that multiple dividing elements 20 can be connected to it at any one time. The communication link 40 could be used purely for power provision and wireless communications could be used between dividing elements and also from dividing elements to the controller. In such an arrangement, the dividing elements may communicate using a shared RF signal with selection data and the like being superimposed on the signal.

As an alternative to using the track/bus for a physical wired connection, it will be appreciated that induction based powering of the dividing elements is also possible.

The intelligent shelving system is preferably arranged to be retrofitted to existing shelving systems.

The invention claimed is:

1. A retrofit intelligent shelving system configured to be placed on a shelf of an existing shelving system, the shelf having a supporting surface having a length and a depth, the retrofit intelligent shelving system comprising:
   one or more dividing elements arranged to communicate with a controller, each of the one or more dividing elements including:
      an antenna having a detection plane and;
      a base for placement on the supporting surface of the shelf to extend along its depth and divide the shelf along the length of its supporting surface, the detection plane of the antenna being substantially parallel to the base,
   wherein each of the one or more dividing elements is arranged to identify electronically tagged items falling within the detection plane of its respective antenna and communicate data on said identified items to the controller,
   the retrofit intelligent shelving system further comprising a communications link connecting each of the one or more dividing elements to the controller, the communications link comprising a track arranged to run along the surface of the shelf.

2. A retrofit intelligent shelving system according to claim 1, wherein each of the one or more dividing elements includes an interface for connection to the track.

3. A retrofit intelligent shelving system according to claim 2, wherein the interface is positioned within each dividing element such that the orientation of the dividing element when connected to the track causes the detection plane of the antenna to be oriented in a direction substantially aligned with the length of the supporting surface.

4. A retrofit intelligent shelving system according to claim 1, wherein the track includes a power supply means for providing power to the one or more dividing elements.

5. A retrofit intelligent shelving system according to claim 1, wherein the track is a bus.

6. A retrofit intelligent shelving system according to claim 1, wherein the one or more dividing elements include an audio and/or visual indicator that is controllable by the dividing element and/or the controller.

7. A retrofit intelligent shelving system according to claim 6, wherein the one or more dividing elements each include an LCD display.

8. A retrofit intelligent shelving system according to claim 1, wherein the one or more dividing elements each include an antenna control system for communication with others of the one or more dividing elements and/or detection of overlapping transmission fields from other antennas, the antenna control system being configured to coordinate with the other dividing elements to optimize transmission signal strength.

9. A retrofit intelligent shelving system according to claim 8, wherein the antenna control system further comprises a subsidiary antenna for monitoring of other overlapping signals.

10. A retrofit intelligent shelving system according to claim 1, wherein the one or more dividing elements each include an RFID transceiver for communication with RFID tags via their respective antenna.

11. A retrofit dividing element for an intelligent shelving system, the dividing element including:
an antenna having a detection plane;
a transceiver coupled to the antenna;
a base for placement on a supporting surface of a shelf to extend along its depth and divide the shelf along the length of its supporting surface; and,
an interface for communication with a remote controller;
wherein the transceiver is arranged to receive signals of detected electronically tagged items falling within the detection plane the antenna and communicate data on said signals to the controller via the interface.

12. A retrofit dividing element according to claim 11, wherein the interface includes a wired connector for connection to a bus.

13. A retrofit dividing element according to claim 11, wherein the interface includes a radio frequency transceiver for communication with the remote controller.

14. A retrofit intelligent shelving system configured to be placed on a shelf of an existing shelving system, the shelf having a supporting surface having a length and a depth, the retrofit intelligent shelving system comprising:
one or more dividing elements arranged to communicate with a controller, each of the one or more dividing elements including:
a primary antenna having a detection plane;
a base for placement on the supporting surface of the shelf to extend along its depth and divide the shelf along the length of its supporting surface, the detection plane of the antenna being substantially parallel to the base; and,
an antenna control system for communication with others of the one or more dividing elements and/or detection of overlapping transmission fields from other antennas, the antenna control system including a subsidiary antenna for monitoring of other overlapping signals and being configured to coordinate with the other dividing elements to optimize transmission signal strength of the primary antenna,
wherein each of the one or more dividing elements is arranged to identify electronically tagged items falling within the detection plane of its respective antenna and communicate data on said identified items to the controller,
the retrofit intelligent shelving system further comprising a communications link connecting each of the one or more dividing elements to the controller, the communications link comprising a track arranged to run along the surface of the shelf.

* * * * *